(12) United States Patent
Humphreys

(10) Patent No.: US 6,227,579 B1
(45) Date of Patent: May 8, 2001

(54) SWIVEL GARDEN HOSE CONNECTOR

(75) Inventor: James W. Humphreys, Pentwater, MI (US)

(73) Assignee: Lakeshore Automatic Products Inc., Grand Haven, MI (US)

( * ) Notice: Subject to any disclaimer, the term of this patent is extended or adjusted under 35 U.S.C. 154(b) by 0 days.

(21) Appl. No.: 09/451,649

(22) Filed: Nov. 30, 1999

(51) Int. Cl.[7] .................................... F16L 27/00
(52) U.S. Cl. ................... 285/281; 285/239; 285/351
(58) Field of Search ......................... 285/272, 275, 285/278, 281, 354, 239, 351

(56) References Cited

U.S. PATENT DOCUMENTS

| | | |
|---|---|---|
| 393,139 | 11/1888 | Bodycomb . |
| 681,067 | 8/1901 | Morrissey . |
| 994,815 | 6/1911 | Booth . |
| 1,083,742 | 1/1914 | Hutchinson . |
| 1,096,436 | 5/1914 | Leyner . |
| 1,157,715 | 10/1915 | Osborne . |
| 1,845,922 | 2/1932 | Marchus . |
| 1,889,980 | 12/1932 | Farley . |
| 1,911,423 | 5/1933 | Biller . |
| 2,172,650 | 9/1939 | Couty ................................. 285/97.5 |
| 2,294,698 | 9/1942 | Strout ................................. 285/97.8 |
| 2,339,746 | 1/1944 | Marchus ................................ 234/19 |
| 2,532,669 | * 12/1950 | Jones . |
| 2,570,406 | * 10/1951 | Troshkin et al. . |
| 2,574,625 | * 11/1951 | Coss . |
| 2,702,200 | 2/1955 | Fukuyama ......................... 285/97.3 |
| 2,833,568 | * 5/1958 | Corsette . |
| 3,999,781 | * 12/1976 | Todd . |
| 4,671,542 | * 6/1987 | Juchnowski . |

* cited by examiner

*Primary Examiner*—Dave W. Arola
(74) *Attorney, Agent, or Firm*—Price, Heneveld, Cooper, DeWitt & Litton

(57) ABSTRACT

A hose female fitting comprising a female hose connector, an elongated swivel nipple interfitted with the female hose connector, the female hose connector having a washer-support shoulder, inner threads for attachment to a male connector, a seal-receiving annular groove and a flange-receiving annular groove in an inner peripheral wall, the nipple having hose-engageable protrusion, a first annular flange extending into the flange-receiving groove of the female hose connector, and a second annular flange abutting the axial outer end of the female hose connector second portion, and an annular seal in the seal-receiving annular groove.

8 Claims, 1 Drawing Sheet

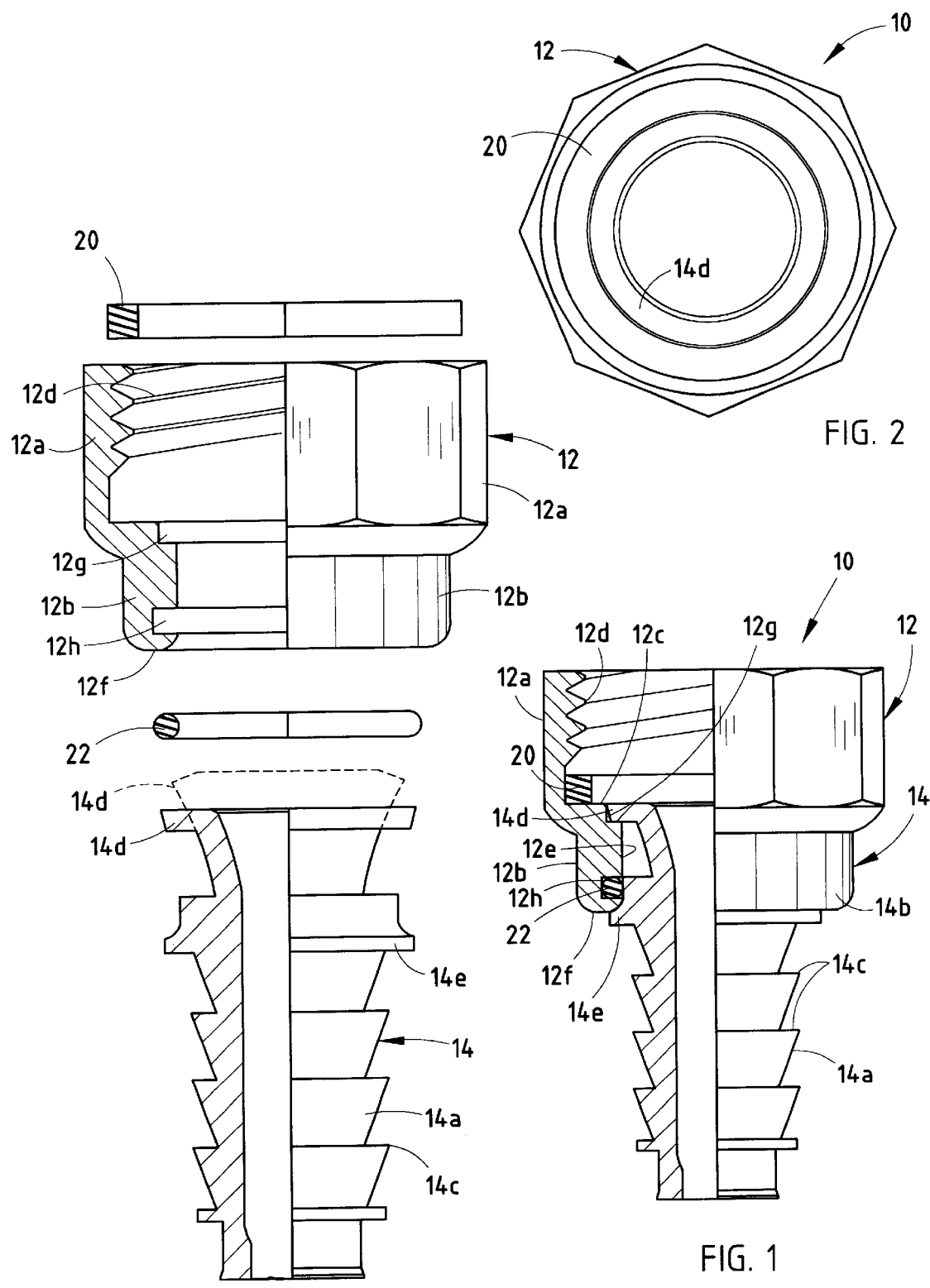

SWIVEL GARDEN HOSE CONNECTOR

BACKGROUND OF THE INVENTION

Garden hose female fittings, when tightened onto a faucet spigot, typically do not allow the hose to rotate relative to the fitting. Therefore, if a torsional twisting force is applied to the hose, as when moving the hose from place to place, the hose will typically kink and deform. This disrupts water flow and also can damage the hose.

SUMMARY OF THE INVENTION

The female hose fitting of this invention comprises two components, namely a female hose connector and an elongated swivel nipple interfitted with the connector to allow the nipple and a hose thereon to swivel relative to the connector in response to torsional force on the hose. The nipple is retained on the connector by a pair of axially spaced, radially outwardly extending annular flanges on the nipple. An O-ring seals the space between the components.

These and other features, advantages and objects of the present invention will be further understood and appreciated by those skilled in the art by reference to the following specification, claims and appended drawings.

BRIEF DESCRIPTION OF THE DRAWINGS

FIG. 1 is an elevational, partially sectioned view of the novel fitting;

FIG. 2 is an end elevational view thereof; and

FIG. 3 is an exploded, partially sectioned view of the fitting components.

DETAILED DESCRIPTION OF PREFERRED EMBODIMENT

Referring now to the drawings, the novel fitting 10 is formed of two components, a female hose connector 12 and an elongated swivel nipple 14 intermitted with the female connector.

The female hose connector 12 has an annular shape or configuration, including a first axial portion 12a and a second axial portion 12b integral with each other. A washer support shoulder 12c is positioned between these first and second axial portions for supporting a conventional annular resilient washer 20. The first axial portion 12a includes inner threads 12d for attachment to a male hose fitting, or more typically a faucet spigot. Preferably the outer peripheral surface of first axial portion 12a is polygonal for ease of rotation either manually or by wrenching. The second axial portion 12b includes an inner peripheral wall 12e and an outer axial end 12f. Machined into this inner peripheral wall 12e of axial portion 12b is a pair of annular grooves. Annular groove 12g is adjacent shoulder 12c to receive an outwardly projecting annular flange of nipple 14, as explained hereinafter. Annular groove 12h receives an O-ring 22 which forms a seal between the female connector and the nipple. Preferably the depth of groove 12g and the thickness of flange 14d are such that the axial exposed end of flange 14d is spaced a few thousandths of an inch below, i.e., axially away from, shoulder surface 12c to absolutely assure there will not be any interference between nipple 14 and a male hose connector or spigot (not shown) threaded to female connector 12 and bearing against annular washer 20.

Nipple 14 includes a first axially elongated portion 14a and a second axial portion 14b which are integral with each other. Portion 14a includes a hose engageable area shown to be a plurality of axially spaced, radially outwardly projecting annular protrusions 14c for engagement with the inner periphery of the end of a hose forced onto these protrusions so that water can freely flow through hollow nipple 14 and the hose. The second axial portion 14b of nipple 14 includes a pair of axially spaced, radially outwardly extending annular flanges 14d and 14e. Flange 14d projects radially outwardly into flange receiving annular groove 12g. Flange 14e abuts the annular axial end 12f of female connector 12. This pair of flanges retain the two components 12 and 14 together.

Flange 14d of nipple 14, prior to assembly of the nipple to female connector 12, is preferably in the orientation depicted in phantom in FIG. 3, so the undeformed nipple can be inserted into the hollow second portion 12b of female connector 12. Assembly of the two components may be achieved by inserting O-ring 22 in its groove 12h, inserting undeformed nipple 14 into hollow second end 12b of connector 12, spinning flange 14d from its initial axially oriented direction to its deformed, radially outwardly projecting condition depicted in the drawings in solid lines, and inserting a resilient annular washer 20 into female connector 12 and onto shoulder 12c. Alternatively, flange 14d can be initially deformed on nipple 14 into the configuration depicted in solid lines in FIGS. 1 and 3, but flange 14e not being formed until after nipple 14 is inserted into connector 12 from the opposite end, and then flange 14e spun down to engage axial end 12f so that the two axially spaced flanges 14d and 14e retain the two components together.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A hose female fitting comprising:

a female hose connector;

an elongated swivel nipple intermitted with said female hose connector;

said female hose connector having an annular shape including a first axial portion, and a second axial portion;

a washer-support shoulder between said first and second axial portions;

said first axial portion having inner threads for attachment to a male connector;

said second axial portion having an inner peripheral wall and an axial outer end;

a seal-receiving annular groove in said inner peripheral wall, and a flange-receiving annular groove in said inner peripheral wall;

said elongated nipple having a first axial portion and a second axial portion;

said nipple first axial portion having annular, hose-engageable, radially outwardly projecting protrusions;

said nipple second axial portion having a first annular, radially outwardly protruding flange extending into said flange-receiving groove of said female hose connector, and having a second annular, radially outwardly protruding flange abutting said axial outer end of said female hose connector second portion; and an annular seal in said seal-receiving annular groove to seal between said connector and said nipple.

2. The hose female fitting in claim 1 wherein said flange-receiving annular groove is adjacent said washer support shoulder.

3. The hose female fitting in claim 1 including an annular resilient washer in said female hose connector on said washer support shoulder.

4. The hose female fitting in claim 1 wherein said female hose connector first axial portion has a polygonal exterior for rotation thereof manually or by wrenching.

5. A hose female fitting comprising:

a female hose connector;

a swivel nipple interfitted with said female hose connector;

said female hose connector having an annular shape including a first axial portion, a second axial portion, and an interior washer-support shoulder;

said first axial portion having inner threads for attachment to a male connector;

said second axial portion having an inner peripheral wall and an axial outer end;

a seal-receiving annular groove and a flange-receiving annular groove in said inner peripheral wall;

said nipple having a first axial portion and a second axial portion;

said nipple first axial portion having a hose-engageable surface area;

said nipple second axial portion having a first radially outwardly protruding flange extending into said flange-receiving groove of said female hose connector, and having a second radially outwardly protruding flange abutting said female hose connector second portion; and an annular seal in said seal-receiving annular groove to seal between said connector and said nipple.

6. The hose female fitting in claim 5 wherein said second flange abuts said female connector axial outer end.

7. The hose female fitting in claim 6 wherein said flange-receiving annular groove is adjacent said washer support shoulder.

8. The hose female fitting in claim 7 including an annular resilient washer in said female hose connector on said washer support shoulder.

* * * * *

UNITED STATES PATENT AND TRADEMARK OFFICE
CERTIFICATE OF CORRECTION

PATENT NO. : 6,227,579 B1
DATED : May 8, 2001
INVENTOR(S) : James W. Humphreys

Page 1 of 1

It is certified that error appears in the above-identified patent and that said Letters Patent is hereby corrected as shown below:

<u>Column 1,</u>
Line 38, "intermitted" should be -- interfitted --.

<u>Column 2, claim 1</u>
Line 41, "intermitted" should be -- interfitted --.

Signed and Sealed this

Twenty-seventh Day of November, 2001

Attest:

*Nicholas P. Godici*

NICHOLAS P. GODICI
*Attesting Officer*  *Acting Director of the United States Patent and Trademark Office*